March 29, 1932. A. MOORHOUSE 1,851,679
HYDRAULIC SHOCK ABSORBER
Filed Oct. 15, 1927
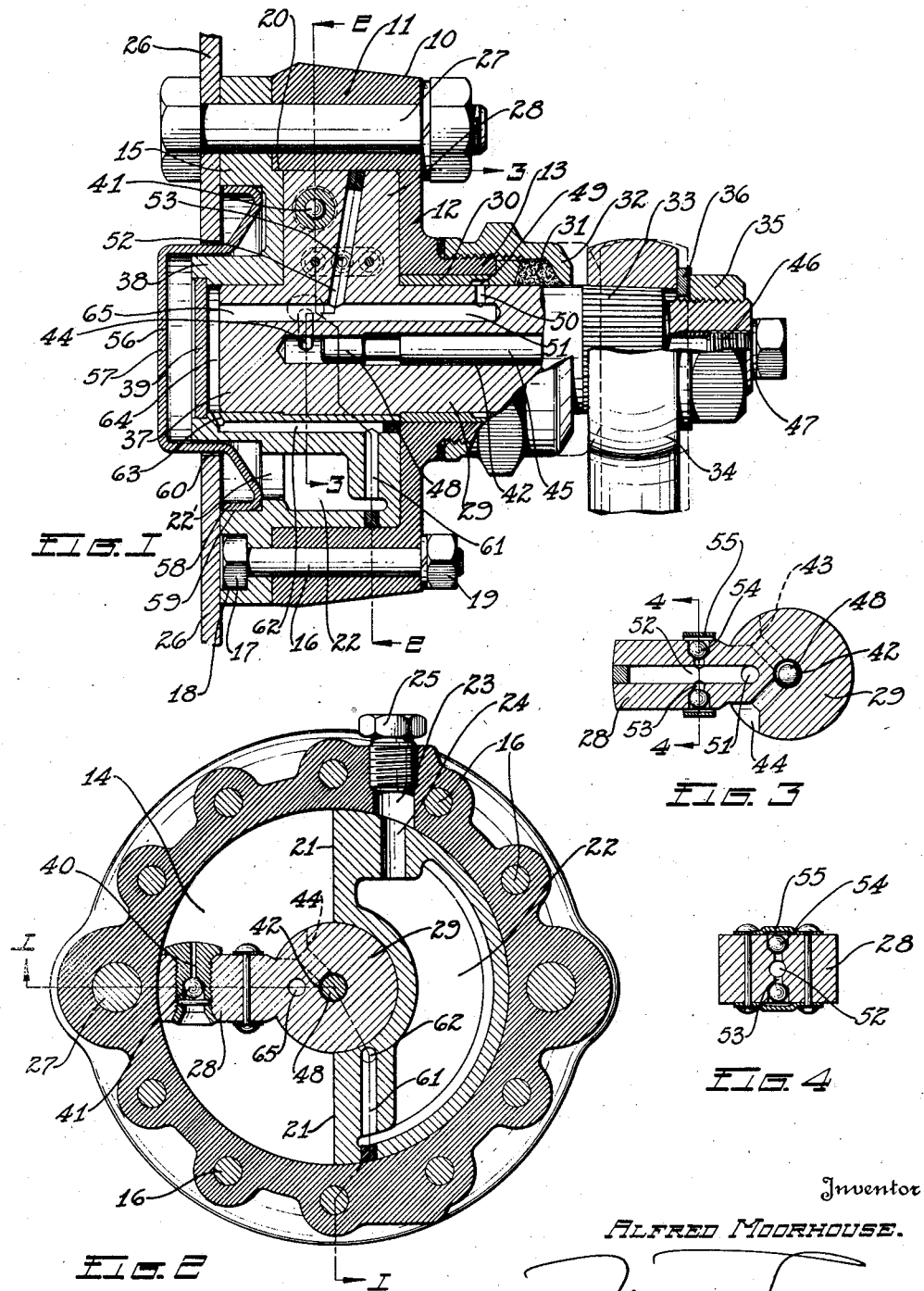
Inventor
ALFRED MOORHOUSE.
By Mellon Tibbetts
Attorney Patented Mar. 29, 1932

1,851,679

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

HYDRAULIC SHOCK ABSORBER

Application filed October 15, 1927. Serial No. 226,282.

This invention relates to hydraulic shock absorbers and more particularly to such shock absorbers as used on motor vehicles between the frame and axle or between other relatively moving parts.

One type of hydraulic shock absorbers is well illustrated in United States patent to Terhorst No. 994,546, dated June 6, 1911. It is one of the objects of the present invention to improve upon such shock absorbers and better adapt them to practical use.

One of the most difficult problems connected with the manufacture of hydraulic shock absorbers has been that of preventing undue leakage of the shock absorbing fluid or liquid from its casing. The Terhorst patent provides the general remedy of a leakage chamber surrounding the oscillating shaft with provision for automatically returning the leakage fluid to the working chamber. An object of the present invention is to better prevent this leakage without duplication or enlargement of packing means, principally by more efficiently returning the leakage fluid to the working chamber and preventing it getting to the packing around the shaft.

In the Terhorst patent referred to, return of the leakage fluid to the working chamber is intermittent due to the single acting type of shock absorber illustrated. It is an object of the present invention to provide, in a single piston device, substantially constant suction at the point of leakage while the shock absorber is in operation, so that there may be no tendency for the fluid to escape past the packing and so that there may be a constant return of fluid to the working chamber to displace any air or other fluid that is forced out of it.

Terhorst's secondary or auxiliary chamber, or the lower part of it at least, serves also to retain some of the leakage oil, or other oil that may be added after the working chamber is filled, and this oil is fed to the non-compression side of the working chamber as it is needed. It is an object of the present invention to provide a more adequate and efficient reserve tank or auxiliary chamber and to so position the chamber that it may be nearly filled without danger of leakage around the piston shaft.

Another object of the invention is to minimize or make easier the necessary machine operations upon the various parts of a hydraulic shock absorber and in the furtherance of this object a single vane or piston is employed and most of the fluid return and fluid supply passages and valves are arranged in the one-piece piston and shaft, thus concentrating most of the drilling and other machine work on a single piece of the device.

Another object of the invention is to simplify the construction generally and in carrying out this object the parts are in some instances made non-adjustable.

Another object of the invention is to provide a construction that lends itself to quantity manufacture, to easy replacement of parts, and to retaining its efficiency over long periods of time without undue attention or repair.

Other objects of the invention will appear from the following description taken in connection with the drawings, which form a part of this specification, and in which:

Fig. 1 is a longitudinal sectional view through a shock absorber made in accordance with this invention, the section being substantially on the line 1—1 of Fig. 2;

Fig. 2 is a section through the shock absorber shown in Fig. 1, taken substantially on the line 2—2 of Fig. 1;

Fig. 3 is a section through the piston and shaft of the shock absorber, taken substantially on the line 3—3 of Fig. 1, and Fig. 4 is a section through the piston on the line 4—4 of Fig. 3.

Referring to the drawings, 10 is the body or casing of the shock absorber, having a cylindrical portion 11, an end wall 12, and a bearing portion 13 extending outwardly from the end wall. The cylindrical portion and the end wall are machined interally to form the working chamber of the shock absorber, indicated at 14 in Fig. 2.

A cover 15 is fitted over the open end of the casing and secured thereto by numerous bolts 16. The hexagon heads 17 of these bolts are arranged in an annular groove 18 machined in the outer face of the cover 15 so that the bolts are held against turning as the nuts 19 are screwed onto their threaded ends.

The cover 15 forms the closure or opposite end wall of the working chamber 14 and it has a cylindrical portion 20 which extends into the casing, as shown particularly in Fig. 1. A section of this cylindrical portion, approximately one-half of it in the form shown, extends across to the opposite wall 12 of the working chamber and forms an abutment for that chamber in co-operation with which the piston, hereinafter described, operates. The abutment, therefore, is substantially of semi-cylindrical form as shown particularly in Fig. 2, the abutment faces being indicated at 21 in that figure. This extended portion of the cover is preferably cored out to form an auxiliary reservoir or reserve tank as indicated at 22 in the drawings. The cored out portion, when the casting is made, is left open at its outer end as shown at 22' so that the sand may be readily and completely cleaned out of the interior. A filling opening for the reservoir is provided by aligned passages 23 and 24, as shown in Fig. 2, and is closed by a plug 25. Both the reservoir and working chamber are substantially filled with oil or glycerine or other desirable working fluid.

The shock absorber is shown mounted upon a support 26 by means of two large bolts 27 which extend through suitable openings in the casing and cover.

Mounted to oscillate in the working chamber 14 is a piston or vane 28 having a shaft 29. The piston is formed to fit precisely to the cylindrical interior of the casing and the flat faces of the end walls, and its shaft extends outwardly through the bearing portion 13 of the end wall 12, in one direction, and into the middle portion of the cover 15 in the other direction, and it also has a bearing in the middle portion of the abutment. In the bearing portion 13 of the casing is a bearing sleeve or liner 30 in which the shaft 29 is actually journaled, and at the end of this sleeve there is a packing 31 compressed against the sleeve and the shaft by a hollow nut 32. Beyond the nut the shaft 29 is serrated as at 33 and an arm 34 is mounted upon this serrated portion and held thereon by nut 35 and lock washer 36. The arm 34 is adapted for connection to the other movable part of the vehicle in the usual way so that the piston will be operated in the working chamber as the vehicle parts move relatively to each other. In dotted lines in Fig. 1 the nut 32 is shown partly retracted and pushing the arm 34 off of the end of the shaft, thus assisting in the removal of that arm when necessary.

The stub end 37 of the shaft 29 is shown as mounted in the middle portion 38 of the cover 15 and the outer end of the portion 38 is closed by a plate or plug 39.

In the operation of a shock absorber of this type it is usually desirable to have the operating arm 34 work with somewhat less resistance in one direction than in the other and for this purpose the piston 28 is provided with a passage 40 therethrough and a check valve 41 closes this passage when the piston 28 is moving downwardly in Fig. 2. Downward movement of the piston, therefore, will be resisted more than the upward movement, though it will be understood that this opening only partly relieves the pressure and does not render the piston entirely inoperative on its up stroke.

Provision is also made for by-passing some of the liquid equally on both strokes of the piston and in the present invention this by-pass means is in the piston shaft itself. The shaft 29 is drilled from its outer end inwardly as at 42, passing through the zone of the piston. There are two lateral passages 43 and 44 which connect with the drilled out passage 42 in different zones, these passages 43 and 44 extending to opposite sides of the piston 28. Then there is a plug 45 threaded into the shaft 29 as at 46 and making a tight joint with the end of the shaft as shown at 47, so that there can be no leakage at that point. The plug can be screwed in tight because there is no adjustment of it.

The inner end of the plug is formed with a head or metering portion 48 arranged between the passages 43 and 44 and nearly but not quite closing that part of the passage 42 which surrounds it. It is a very easy matter to machine or grind the inner end of the passage 42 and the exterior of the head 48 to very close limits so that the annular passage formed between these two finished surfaces will be definitely fixed and unchangeable. This annular passage of course determines the amount of liquid normally by-passed from one side of the piston to the other in the operation of the piston and consequently determines the power or resistance of the shock absorber.

The difficult problem of preventing undue leakage of the shock absorber fluid from the casing has been met in this invention by providing substantially constant suction on the leakage groove. The leakage groove is shown at 49 between the shaft 29 and its bearing 30, the groove being formed in the instance shown in the bearing. Since the bearing sleeve 30 is a press-fit in the casing, the only chance for leakage at this point is between the shaft and the bearing and the fluid leaking therethrough will be caught by the leakage groove 49. The groove 49 is connected to the working chamber through check valves that open it to the suction side of the piston no matter which way the piston is operating. Thus a conduit is formed by passages 50, 51, 52 and 53 in the shaft and piston and a pair of check valves 54 are arranged in the passage 53 so that that passage is open only to the retreating side of the piston, which of course is the suction side. The check valves 54 are formed by balls held in place by spaced plates 55, as shown particularly in Figs. 3 and 4.

By thus providing for constant suction in the passage 51 and consequently in the leakage groove 49, whatever oil or other fluid may be forced out of the working chamber 14 by the operation of the shock absorber will be caught by the leakage groove 49 and immediately returned to the working chamber through the passages and check valves above referred to so that practically none of this leakage oil can reach the packing 31.

In order to close the reserve tank or auxiliary chamber 22 a plate is provided over the opening 221 and in the form here shown this plate is a stamping or enclosing piece 56 which extends somewhat outwardly from the reservoir thereby considerably enlarging it. This stamping has a central cylindrical portion 57 which extends over the middle part 38 of the cover 15 in which the stub end 37 of the piston shaft is mounted, and a reverse flange 58 which is pressed into a cylindrical part 59 of the cover so that it makes a tight fit with the cover and thereby forms an enlargement of the reservoir 22. The support 26 upon which the shock absorber is mounted is preferably cut away at 60 to permit the use of the enlarged bearing for the stub end of the shaft and for this enlarged reservoir.

The reservoir 22 is connected with the working chamber through suitable check valves so that liquid from the reservoir will be added to that in the chamber as it is needed. In the present invention this is accomplished by connecting the reservoir through the same check valves as are used for the leakage return. Thus there are passages 61, 62 and 63 formed in the cover piece 15, a passage 64 at the end of the shaft 29, and a passage 65 in the shaft running into the passage 52 in the piston. The passage 52 connects through the passage 53 with the check valves 54 so that there is also constant suction on the auxiliary reservoir 22, and should there be leakage from the working chamber which is not returned by the leakage return means, additional liquid will be supplied from the reservoir 22 through the conduit means above described.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A shock absorber comprising a working chamber containing liquid, a piston movable in the chamber, a reserve chamber, and means acting on movement of the piston in either direction to convey liquid from the reserve chamber through the piston to said working chamber to replace fluid escaping therefrom.

2. In a single piston hydraulic shock absorber, means in the piston and its shaft for returning leakage liquid on either stroke of said piston.

3. In a single piston hydraulic shock absorber, means in the piston and its shaft for conveying additional liquid on either stroke of the piston.

4. In a shock absorber having a leakage groove, a piston and its shaft, and means in said piston and shaft for maintaining a substantially constant suction on said groove during operation of the absorber.

5. In a shock absorber, the combination of a casing, a piston and shaft having a bearing in said casing, said shaft and bearing forming a leakage receiving groove, and means in said shaft and piston for maintaining substantially constant suction on said groove during operation of the absorber.

6. In a shock absorber, the combination of a casing having a cylindrical portion and an end wall, a piston operating in said cylindrical portion and having a shaft extending through and having a bearing in said end wall, and an auxiliary reservoir forming a closure for the opposite end of said casing.

7. In a shock absorber, the combination of a casing having a cylindrical portion and an end wall, a piston operating in said cylindrical portion and having a shaft extending through and having a bearing in said end wall, and an auxiliary reservoir forming a closure for the opposite end of said casing, and conduit means connecting the lower part of said reservoir with said cylindrical portion on opposite sides of said piston.

8. In a shock absorber, the combination of a casing having a cylindrical portion and an end wall, a piston operating in said cylindrical portion and having a shaft extending through and having a bearing in said end wall, said shaft also extending beyond the piston at the opposite end of the casing, and an auxiliary reservoir extending over the extended part of said shaft and forming a closure for said opposite end of the casing.

9. In a shock absorber, the combination of a support having an opening therein, a shock absorber having a working chamber and an auxiliary chamber and means for securing said absorber to said support with the auxiliary chamber extending into said opening.

10. A shock absorber comprising a casing having bearing parts extending outwardly from either end, a piston in the casing having a shaft mounted in said bearing parts and extending through one of them, and an auxiliary reservoir extending over the other end of said shaft.

11. A shock absorber comprising a casing having a cylindrical portion and end portions, a piston having a shaft mounted in said end portions, leakage preventing means at one end of the casing and a reservoir at the other end of the casing.

12. A shock absorber comprising a casing having a cylindrical portion and end portions, a piston having a shaft mounted in said end portions, leakage preventing means at one end of the casing and a reservoir at the other end of the casing, and means connecting both the leakage means and the reservoir with said cylindrical portion on opposite sides of the piston.

13. A shock absorber comprising a piston casing, a piston therein, and a closure for the casing, part of said closure extending into the casing in the zone of the piston and being formed with an internal reservoir.

14. A shock absorber comprising a cylindrical casing, a piston adapted to oscillate in a portion of said casing, and a closure for said casing having a portion extending into said casing and forming an abutment, said closure being formed with an internal reservoir.

15. A shock absorber comprising a casing having a working chamber, a piston in the chamber having a shaft mounted in the casing and extending through one wall thereof, and an auxiliary reservoir connected to supply additional fluid to the working chamber, by-pass, leakage and additional supply conduits being formed in the piston and shaft part of the absorber.

16. A shock absorber comprising a casing having a working chamber, a piston in the chamber having a shaft mounted in the casing and extending through one wall thereof, and an auxiliary reservoir connected to supply additional fluid to the working chamber, leakage and additional supply conduits and valves being formed or mounted in the piston and shaft part of the absorber.

17. A shock absorber comprising a casing having a working chamber, a piston in the chamber having a shaft mounted in the casing and extending through one wall thereof, and an auxiliary reservoir connected to supply additional fluid to the working chamber, leakage and additional supply conduits being formed in the piston and shaft, and valves mounted in the piston for controlling said conduits.

18. A shock absorber comprising a casing having a cylindrical chamber, a cover secured to said casing and having a cylindrical portion extending into said chamber, approximately one-half of said portion extending to the opposite wall of said chamber and forming an abutment, and a piston mounted in the chamber.

19. A shock absorber comprising a casing having a cylindrical chamber, a cover secured to said casing and having a cylindrical portion extending into said chamber, approximately one-half of said portion extending to the opposite wall of said chamber and forming an abutment, a piston mounted in the chamber, and an enclosing piece over the cover forming therewith an auxiliary reservoir for the chamber.

20. A shock absorber comprising a casing having a cylindrical chamber, a cover secured to said casing and having a cylindrical portion extending into said chamber, approximately one-half of said portion extending to the opposite wall of said chamber and forming an abutment and a reservoir, a piston mounted in the chamber, and conduit means connecting the reservoir and chamber.

21. In shock absorbing means, the combination with a support having an opening, of a shock absorber casing secured to said support, a portion of said casing extending into said opening.

22. In shock absorbing means, the combination with a support having an opening, of a shock absorber having a working chamber and an auxiliary chamber, said auxiliary chamber having an extended portion, and means securing said shock absorber to said support with its extended chamber portion in said opening.

23. In a shock absorber, the combination of a casing having a cylindrical portion and an end wall, a piston operating in the cylindrical portion and having a shaft extending through and bearing in said end wall, and a cover for the opposite end of the casing forming a passage between said cover and the end of the shaft.

24. In a shock absorber, the combination of a casing having a cylindrical portion and an end wall, a piston operating in said cylindrical portion having a shaft extending through and having a bearing in said end wall, a cover for the opposite end of the casing forming a passage between said cover and the end of the shaft, a liquid reservoir for the shock absorber and conduit means connecting the lower part of said reservoir with said passage.

25. A shock absorber comprising a casing having end portions, a piston having a shaft mounted in said end portions, leakage preventing means at one end of the casing, a passage at the other end of the casing at the end of the shaft, a liquid reservoir, and conduit means connecting said reservoir with said passage.

26. In a shock absorber, a casing having end portions, a working chamber in the casing, a piston operable in the working chamber and having a shaft mounted in said end portions, a liquid reservoir, a passage at one end of the shaft, conduit means connecting the passage with the reservoir and means connecting the reservoir with the working chamber on opposite sides of the piston.

27. In a shock absorber having a leakage groove, a working chamber containing liquid, a piston movable in said chamber, a liquid reservoir communicating with said chamber on both sides of said piston, and means for maintaining a substantially constant suction on said groove and said reservoir during operation of the absorber to convey liquid therefrom to said chamber on either side of said piston.

28. In a shock absorber having a leakage groove, a working chamber containing liquid, a piston movable in said chamber, a liquid reservoir, and a common duct means for conveying liquid from said groove and from said reservoir into said working chamber.

29. In a shock absorber having a working chamber containing liquid, a vane piston in said chamber, a liquid reservoir, a single passage means through the piston connecting said reservoir with said chamber on either side of said piston, and means for maintaining a constant suction in the passage means to convey liquid to said chamber during operation of said piston.

30. A shock absorber comprising a working chamber containing liquid, a piston movable in the chamber, and a single duct means associated with said piston through which liquid from said reservoir travels in passing to said working chamber on the suction side of the piston.

31. In a shock absorber, the combination of a casing having an end wall, a cover for the casing forming an opposite end wall over a portion of the casing and having a part extending into the casing and forming an abutment, a second cover extending over the first cover and forming a chamber therebetween, means for securing the two covers firmly to the casing, and a piston mounted to oscillate between the first mentioned cover and the casing end wall.

32. A shock absorber comprising a casing closed at one end, a member extending into the casing and forming therewith a fluid containing working chamber, said member having a fluid reservoir therein adapted to communicate with the working chamber, a piston in the working chamber, and a cover in spaced relation with the member, the space between the cover and the member forming a fluid reservoir in open communication with the reservoir in the member.

In testimony whereof I affix my signature.
ALFRED MOORHOUSE.